United States Patent [19]

Liu et al.

[11] Patent Number: 4,678,849
[45] Date of Patent: Jul. 7, 1987

[54] HEAT-CURABLE MIXTURE CONTAINING SUBSTITUTED BICYCLO(2.2.1)HEPT-5-ENE-2,3-DICARBOXIMIDE AND POLYMALEIMIDE

[75] Inventors: Marie W. Liu, Fountain Valley; Victor Ho, Huntington Beach, both of Calif.

[73] Assignee: Ciba-Geigy Corporation, Ardsley, N.Y.

[21] Appl. No.: 831,687

[22] Filed: Feb. 21, 1986

[51] Int. Cl.[4] ............................................. C08F 26/06
[52] U.S. Cl. .................................... 526/259; 526/261; 526/262; 528/322; 428/500; 428/521
[58] Field of Search ....................... 526/259, 261, 262; 528/322

[56] References Cited

U.S. PATENT DOCUMENTS

| | | | |
|---|---|---|---|
| 3,380,964 | 4/1968 | Grundschober et al. | 260/47 |
| 3,562,223 | 2/1971 | Bargalu et al. | 260/78 |
| 3,658,764 | 4/1972 | Bargalu et al. | 260/78 |
| 4,038,251 | 7/1977 | Forgo et al. | 260/47 |
| 4,100,140 | 7/1978 | Zahir et al. | 526/90 |
| 4,515,962 | 5/1985 | Renner | 548/435 |
| 4,587,317 | 5/1986 | Renner | 526/259 |

FOREIGN PATENT DOCUMENTS 1443067 7/1976 United Kingdom .

Primary Examiner—Harold D. Anderson
Attorney, Agent, or Firm—Harry Falber

[57] ABSTRACT

Heat-curable mixtures comprising
(a) at least one compound of the formula

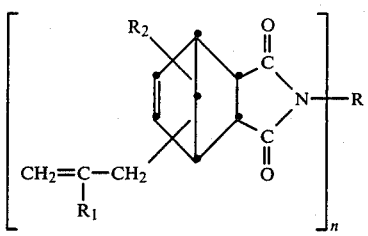

(b) at least one compound of the formula

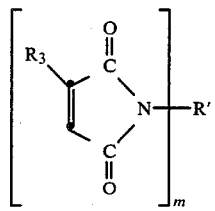

(c) at least one alkenyl phenol or alkenyl phenol ether, and
(d) triallylisocyanurate, said mixtures being suitable for the preparation of molded articles such as prepregs and composites, coatings and the like.

18 Claims, No Drawings

HEAT-CURABLE MIXTURE CONTAINING SUBSTITUTED BICYCLO(2.2.1)HEPT-5-ENE-2,3-DICARBOXIMIDE AND POLYMALEIMIDE

European patent application No. 105024 A1 discloses allyl- or methallyl-substituted bicyclo[2.2.1]hept-5-ene-2,3-dicarboximides and the use thereof for the manufacture of polymers by heating the imides to temperatures ranging from 180° C. to 300° C. It is also known that polymaleimides can be converted into cross-linked products with or without the addition of crosslinking agents such as diamines or alkenyl phenols (for example, U.S. Pat. Nos. 3,562,223, 3,658,764, 3,380,964, 4,038,251 and 4,100,140.)

When the carboximide-containing systems are used in a variety of applications such as in the preparation of composites and prepegs, it is desired that the systems are sufficiently rapidly cured, are not brittle, are tacky and exhibit good drape properties in thin film form, have reasonable gel times and show adequate strength and stability. The prior systems have generally been inadequate in at least one of these performance characteristics.

It has now been discovered that by utilizing blends of the indicated dicarboximides, polymaleimides, alkenyl phenols or alkenyl phenol ethers and triallylisocyanurate, significantly improved properties are obtained. These mixtures exhibit high curing activity in the presence of a curing catalyst; satisfactory flexibility, tack, drape properties and gel time; and good mechanical, thermal and electrical properties. The cured systems are thus well-suited for use in high performance composites and similar areas of application, the latter composites also forming an important part of this invention.

The present invention relates to novel heat-curable mixtures comprising
(a) at least one compound of formula I

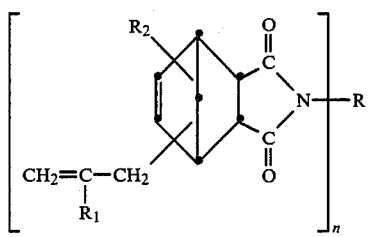

(b) at least one compound of formula II

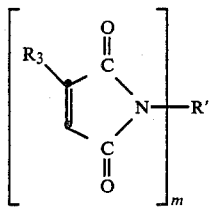

(c) at least one alkenyl phenol or alkenyl phenol ether, and
(d) triallylisocyanurate.

Regarding the compounds of formulae I and II, n is 1 or 2 and m is 2 or 3,

R if n is 1, is a hydrogen atom, $C_1-C_{12}$-alkenyl, $C_5-C_8$-cycloalkyl, $C_6-C_{10}$-aryl or benzyl, or if n is 2, is $-C_pH_{2p}-$, wherein p is 2 to 20, in particular $-(CH_2)_p-$, wherein p is 2 to 12, or is $C_6-C_{10}$-arylene or a group of the formula III

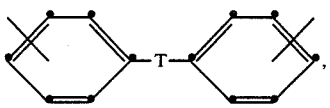

wherein T is methylene, isopropylidene, $-CO-$, $-O-$, $-S-$ or $-SO_2-$,

R' is an organic radical of valency m which contains 2 to 30 carbon atoms, and $R_1$, $R_2$ and $R_3$ are each independently a hydrogen atom or a methyl group.

R may be a straight, chain or branched chain $C_1-C_{12}$-alkyl group such as methyl, ethyl, isopropyl, n-butyl, isopentyl, n-hexyl, 2-ethylhexyl, n-decyl, and n-dodecyl, but is preferably $C_1-C_8$-alkyl. R as $C_3-C_6$-alkenyl may also be straight chain or branched and is for example allyl, methallyl, 2-butenyl and 3-hexenyl, with allyl being preferred. A cycloalkyl group R may be a cyclopentyl, cyclohexyl, cycloheptyl or cyclooctyl group, with cyclohexyl being preferred.

An aryl group R may be unsubstituted phenyl or a phenyl group which is substituted by one or two methyl groups, e.g. tolyl or xylyl, or is naphthyl. Preferably R is a phenyl group. R as a $-C_pH_{2p}$-group may be a straight chain or branched radical such as ethylene, propylene, trimethylene, tetramethylene, hexamethylene, octamethylene and dodecamethylene. Preferably R is a $-(CH_2)_p$-group in which p is 2 to 12. A group of formula III represented by R is preferably attached in the 4,4'-position to the N-atoms.

R as a $C_6-C_{10}$-arylene group may be a m-phenylene, p-phenylene, 1,3-naphthylene, 1,4-naphthylene, 1,5-naphthylene or 2,6-naphthylene group.

If R is a group of the formula III, T is preferably the methylene group, $-O-$ or $-SO_2-$.

Preferred compounds of formula I are those wherein each of $R_1$ and $R_2$ is a hydrogen atom and R, if n is 1, is hydrogen, $C_1-C_8$-alkyl, allyl, cyclohexyl, phenyl or benzyl; or, if n is 2, R is $-(CH_2)_p-$, in which p is 2 to 12, m- or p-phenylene, or is a group of formula III, wherein T is the methylene group, $-O-$ or $-SO_2-$.

Particularly preferred compounds of formula I are those wherein each of $R_1$ and $R_2$ is a hydrogen atom and R, if n is 1, is allyl or, if n is 2, is $-(CH_2)_6-$ or

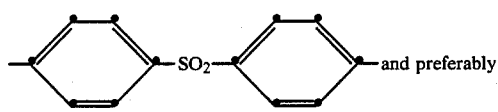

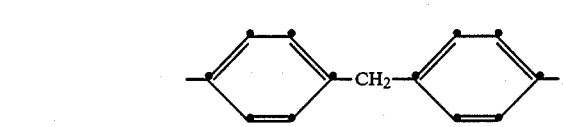

Most preferably, the mixtures of this invention contain, as components N-allyl-allylbicyclo[2.2.1]-hept-5-ene-2,3-dicarboximide, bis[4-(allylbicyclo)[2.2.1]hept-5-ene-2,3-dicarboximidophenyl)]-methane and N,N'- hexamethylene-bis(allylbicyclo[2.2.1]hept-5-ene-2,3-dicarboximide).

Examples of specific compounds of formula I are:
N-methyl-allylbicyclo[2.2.1]hept-5-ene-2,3-dicarboximide,
N-allyl-allylbicyclo[2.2.1]hept-5-ene-2,3-dicarboximide,
N-(2-ethylhexyl)-allylbicyclo[2.2.1]hept-5-ene-2,3-dicarboximide,
N-cyclohexyl-allylbicyclo[2.2.1]hept-5-ene-2,3-dicarboximide,
N-phenyl-allylbicyclo[2.2.1]hept-5-ene-2,3-dicarboximide,
N-benzyl-allylbicyclo[2.2.1]hept-5-ene-2,3-dicarboximide,
N,N'-ethylene-bis(allylbicyclo[2.2.1]hept-5-ene-2,3-dicarboximide),
N,N'-hexamethylene-bis(allylbicyclo[2.2.1]hept-5-ene-2,3-dicarboximide),
N,N'-dodecamethylene-bis(allylbicyclo[2.2.1]hept-5-ene-2,3-dicarboximide),
bis[4-(allylbicyclo[2.2.1]hept-5-ene-2,3-dicarboximidophenyl)]methane,
bis[4-(methallylbicyclo[2.2.1]hept-5-ene-2,3-dicarboximidophenyl]methane,
N,N'-p-phenylene-bis(allylbicyclo[2.2.1]hept-5-ene-2,3-dicarboximide),
bis[4-(allylbicyclo[2.2.1]hept-5-ene-2,3-dicarboximidophenyl)]ether,
bis[4-(allylbicyclo[2.2.1]hept-5-ene-2,3-dicarboximidophenyl)]sulfone,
N-allyl-allylmethylbicyclo[2.2.1]-hept-5-ene-2,3-dicarboximide,
N-(2-ethylhexyl)-allylmethylbicyclo[2.2.1]hept-5-ene-2,3-dicarboximide,
N-phenyl-allylmethylbicyclo[2.2.1]hept-5-ene-2,3-dicarboximide,
N,N'-hexamethylene-bis(allylmethylbicyclo[2.2.1]hept-5-ene-2,3-dicarboximide), and
bis[4-(allylmethylbicyclo[2.2.1]hept-5-ene-2,3-dicarboximidophenyl)methane.

The imides of formula I can be prepared in a manner known per se, for example, by the process described in European patent application No. 105,024 Al, by reacting an anhydride of formula IV

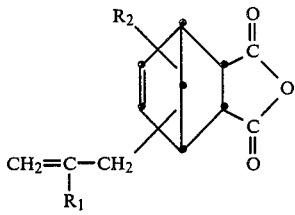

with a compound of formula V $(H_2N)_n$—R  (V)

wherein R, $R_1$, $R_2$ and n are as defined for formula I, at elevated temperature, while distilling off the water of reaction. Where the compound of formula V is ammonia or a low boiling monoamine, it is advisable to use an excess of this reactant. Diamines will conveniently be employed in stoichiometric proportion. The reaction can be carried out without a solvent or in the presence of an inert solvent suitable for removing the water as an azeotrope (entrainer). The reaction temperature can be in the range from 100° to 250° C. It is preferred to prepare the imides of formula I in the melt under a pressure of not more than 4500 Pa in the temperature range from 130° to 220° C., preferably from 180° to 220° C.

Examples of suitable organic radicals R' when m is 2 are: $C_pH_{2p}$-wherein p is 2 to 20, preferably—$(CH_2)_p$—, wherein p is 2 to 12, —$CH_2CH_2SCH_2CH_2$—, $C_6$-$C_{10}$arylene, xylylene, cyclopentylene, cyclohexylene, 1,4-bis(methylene)cyclohexylene, the radical of bicyclohexylmethane, or radicals of the formulae VI or VII

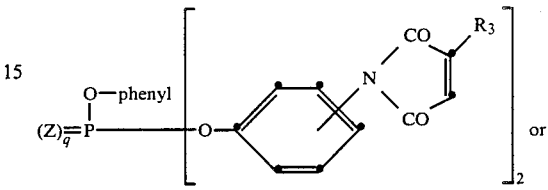

(VI)

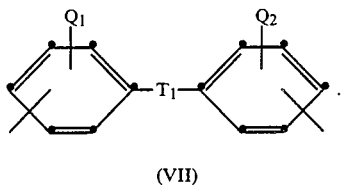

(VII)

If m is 3, then R' is e.g. a radical of formula VIII

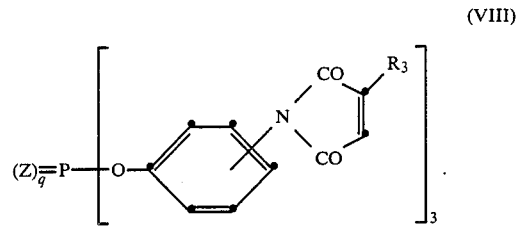

(VIII)

In the above formulae VI or VIII, $T_1$ is methylene, isopropylidene, —CO—, —S—, —SO$_2$—, —P=O(Q$_3$)—, —NQ$_3$— (Q$_3$=C$_1$-C$_4$alkyl), —N=N—, —CONH—, —COO—, —NQ$_3$—CO—X—CO—NQ$_3$—, —O—CO—X—CO—O—,

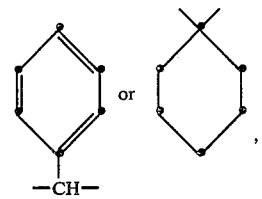

q is 0 or 1,
Z is O or S,
$Q_1$ and $Q_2$ are each independently of the other a halogen atom, preferably chlorine or bromine, or are methyl or ethyl and, most preferably, a hydrogen atom,
X is a direct bond, —$C_tH_{2t}$—, in which t is 1 to 12, $C_6$-$C_{10}$arylene, xylylene, cyclopentylene or cyclohexylene, and $R_3$ is as defined above.

Typical examples of maleimides of formula II which the mixtures of this invention may contain are:
N,N'-ethylene-bismaleimide, N,N'-hexamethylene bismaleimide,
N,N'-m-phenylene bismaleimide,
N,N'p-phenylene bismaleimide,
N,N'-4,4'-diphenylmethane-bismaleimide,
N,N'-4,4'-3,3'-dichlorodiphenylmethane-bismaleimide,
N,N'-4,4'-diphenyl ether-bismaleimide,
N,N'-4,4'-diphenylsulfone-bismaleimide,
N,N'-m-xylylene-bismaleimide,
N,N'-p-xylylene-bismaleimide,
N,N'-4,4'-2,2-diphenylpropane-bismaleimide,
the N,N'-bismaleimide of 4,4'-diaminotriphenylphosphate,
the N,N'-bismaleimide of 4,4'-diaminotriphenylphosphite,
the N,N'-bismaleimide of 4,4'-diaminotriphenylthiophosphate,
the N,N',N''-trismaleimide of tris(4-aminophenyl)phosphate,
the N,N',N''-trismaleimide of tris(4-aminophenyl)phosphite,
the N,N',N''-trismaleimide of tris(4-aminophenyl)phosphite, and
the N,N',N''-trismaleimide of tris(4-aminophenyl)thiophosphate.

Preferred compounds of formula II are those wherein m is 2, $R_3$ is a hydrogen atom and R' is $-(CH_2)_p-$, in which p is 2 to 12, or is m- or p-phenylene, m- or p-xylylene, 1,4-cyclohexylene, 1,4-bis(methylene)-cyclohexylene, the radical of 4,4'-biscyclohexylmethane and, in particular, a radical of formula VII which is attached to the nitrogen atoms in the 4,4'-position, wherein each of $Q_1$ and $Q_3$ is a hydrogen atom and $T_1$ is O, $CH_2$ or $SO_2$. The most preferred compound of formula II is N,N', 4,4'-diphenylmethane-bis-maleimide.

According to the invention, allylphenols and methallylphenols, or the ethers thereof, are preferably employed as the alkenylphenols or alkenylphenol ethers. Both mononuclear and polynuclear, preferably binuclear, alkenylphenols and alkenylphenol ethers can be employed. Preferably, at least one nucleus contains both an alkenyl group and a phenolic, optionally etherified OH group.

As is known, alkenylphenols are manufactured by rearrangement of the alkenyl ethers of phenols (for example of the allyl ether of phenol) by the action of heat (Claisen rearrangement). These alkenyl ethers are also obtained according to known processes by reacting phenols and, for example, allyl chloride in the presence of an alkali metal hydroxide and solvents. As is known, a condensation reaction takes place (elimination of an alkali metal chloride).

Typical examples are compounds of formula (IX)

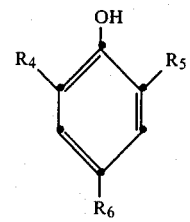

wherein $T_2$ is a direct bond, methylene, isopropylidene, $-O-$, $-S-$, $-SO-$ or $-SO_2-$.

Propenyl-substituted phenols of formula (X)

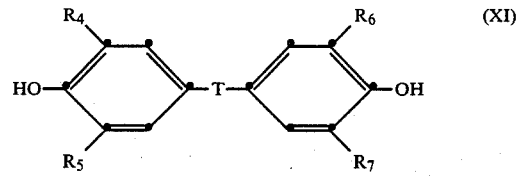

wherein $R_4$, $R_5$, and $R_6$ are each independently a hydrogen atom or $C_3-C_4$alkenyl, preferably an allyl or propenyl group, with the proviso that at least one of $R_4$ to $R_6$ is alkenyl, preferably a propenyl group.

Compounds of formula XI

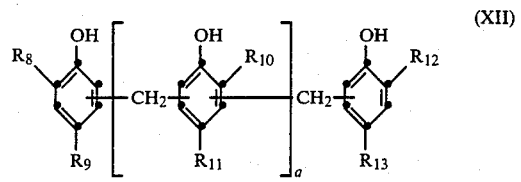

wherein $R_4$, $R_5$, $R_6$ and $R_7$ are each independently a hydrogen atom or $C_3-C_4$alkenyl, preferably an allyl or propenyl group, with the proviso that at least one of $R_4$ to $R_7$ is alkenyl, preferably a propenyl group, and T is as defined for formula III. And Compounds of formula XII

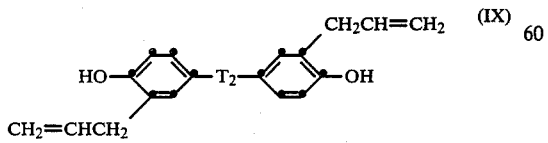

wherein $R_8$, $R_9$, $R_{10}$, $R_{11}$, $R_{12}$ and $R_{13}$ are each independently a hydrogen atom, $C_1-C_4$-alkyl, $C_3-C_4$alkenyl, preferably allyl or propenyl, with the proviso that at least one of $R_8$ to $R_{13}$ is alkenyl, preferably a propenyl group, and a is a value from 0 to 10. Compounds of formula (XI) are preferred in which each of $R_4$ and $R_6$ is a propenyl group and each of $R_5$ and $R_7$ is a hydrogen atom and T is methylene, isopropylidene or $-O-$.

It is also possible to use mixtures of isomers of propenyl- and allyl-substituted mono- or polyhydric phenols. Among the mixtures of isomers, it is preferred to use mixtures of propenyl- and allyl-substituted phenols of formula XI, preferably those which are obtained by partial isomerization of allyl-substituted phenols of formula XIIa.

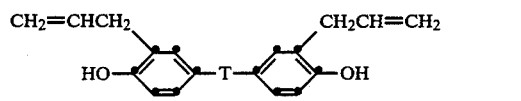

wherein T is methylene, isopropylidene or O.

According to the invention, the use of mixtures of polynuclear alkenylphenols and/or alkenylphenol ethers with mononuclear alkenylphenols and/or alkenylphenol ethers also gives good results. The alkenylphenol ethers preferably employed are those substances which contain one or more molecular radicals of the formula XIII $$-O-R_3 \quad \text{(XIII)}$$

in which $R_3$ denotes an alkyl radical with 1 to 10C atoms, an aryl radical or an alkenyl radical, preferably allyl or methallyl, the O atom in formula XIII representing the phenolic ether bridge.

A further embodiment of the invention is the use of mixtures of those substances which contain only one OH group and only one alkenyl group on the aromatic nucleus with substances which contain several OH groups and/or several alkenyl groups on the aromatic nucleus, or of mixtures of the corresponding phenol ethers of these substances. The corresponding methallyl compounds can also be used.

Such alkenyl-substituted phenols and polyols are disclosed e.g. in U.S. Pat. Nos. 4,100,140 and 4,371,719. Typical materials include 0,0′-diallyl-bisphenol A, 4,4′-dihydroxy-3,3′-diallyldiphenyl, bis(4-hydroxy-3-allylphenyl)methane, 2,2-bis(4-hydroxy-3,5-diallylphenyl)propane, eugenol, 0,0′-dimethallyl-bisphenol A, 4,4′-dihydroxy-3,3′-dimethallyldiphenyl, bis(4-hydroxy-3-methallylphenyl)methane, 2,2-bis(4-hydroxy-3,5-dimethallylphenyl)propane, 4-methallyl-2-methoxyphenol, 2,2-bis(4-methoxy-3-allylphenyl)propane, 2,2-bis(4-methoxy-3-methallylphenyl)propane, 4,4-dimethoxy-3,3′-diallyldiphenyl, 4,4′-dimethoxy-3,3′-dimethallyldiphenyl, bis(4-methoxy-3-allylphenyl)methane, bis(4-methoxy-3-methallylphenyl)methane, 2,2-bis(4-methoxy-3,5-diallylphenyl)propane, 2,2-bis(4-methoxy-3,5-dimethallylphenyl)propane, 4-allylveratrole and 4-methallylveratrole.

With regard to respective concentrations, component (a) is present in an amount of 30 to 45%, by weight; component (b) in an amount of 20 to 40%, by weight; component (c) in an amount of 11 to 22%, by weight; and component (d) in an amount of 12 to 16%, by weight. Preferred concentrations are 30 to 32% of (a), 36 to 39% of (b), 12 to 14% of (c) and 13 to 15% of (d), all being by weight. When the three preferred dicarboximides are utilized (as itemized hereinabove), they are present in weight ratios of 3:2:1, and preferably 2.7:1.7:1.

The mixtures of this invention can be prepared in a manner known per se by grinding and blending or by melting the components. Typical mixing temperatures range from 90° to 140° C.

The curing or processing of the mixtures can be carried out in an inert organic solvent, but preferably from the melt. Curing may be conducted on the mixture per se. However mechanical properties are improved when curing is conducted in the presence of a curing catalyst. Examples of inert organic solvents are: N,N-dimethylformamide, N,N-dimethylacetamide, N-methylpyrrolidone, toluene, xylene, methyl ethyl ketone, and ethylene glycol monoalkyl or dialkyl ethers containing 1 to 4 carbon atoms in the alkyl moiety or moieties. Depending on the nature of the component (c) employed and on the intended utility, suitable curing catalysts may be for example organic peroxides such as di-tert-butyl peroxide, dicumyl peroxide or tert-butyl perbenzoate, or basic catalysts, in particular primary, secondary and tertiary amines, for example diethylamine, tributylamine, triethylamine, benzylamine, N,N,N′,N′-tetramethyl-4,4′-diaminodiphenylmethane, N,N-diisobutylaminoacetonitrile, and heterocyclic bases such as quinoline, N-methylpyrrolidone and imidazole. The latter basic catalysts are preferred. Curing is normally conducted at temperatures of from 150° C. to 350° C., and preferably 180° to 300° C.

The mixtures of this invention are low melting solid to liquid resins and are distinguished by high reactivity, and good thermal mechanical properties of the products cured with them, for example good flexural and shear strength or interlaminary shear strength. Products obtained with them have good mechanical, thermal and electrical properties, have high glass transition temperatures and are substantially non-brittle. The mixtures of this invention are readily applied from the melt, especially without the addition of non-volatile solvents, for example, for impregnation.

Upon curing at elevated temperatures, a network of high crosslink density occurs. Accordingly, the expression "cure" as used herein, denotes the conversion of the mixtures into insoluble and infusible crosslinked products, with simultaneous shaping to give shaped articles such as castings, pressings or laminates, or to give two-dimensional structures such as coatings, enamels or adhesive bonds. The modified systems are advantageous for the formation of coatings because of the improved toughness of the resulting cured coatings.

The modified mixtures prepared according to the invention can furthermore be mixed, at any stage before cure, with usual modifiers such as extenders, fillers and reinforcing agents, pigments, dyestuffs, organic solvents, plasticizers, tackifiers, rubbers, accelerators, diluents, and the like. As extenders, reinforcing agents, fillers and pigments which can be employed in the curable mixtures according to the invention there may be mentioned, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aerosil"), lithopone, barite, titanium dioxide, carbon black, graphite, iron oxide, or metal powders such as aluminum powder or iron powder. It is also possible to add other usual additives, for example, flameproofing agents, agents for conferring thixotropy, flow control agents such as silicones, cellulose acetate butyrate, polyvinyl butyrate, waxes, stearates and the like (which are in part also used as mold release agents) to the curable mixtures.

It is also possible in adhesive formulations, for example, to add rubbers such as carboxyl-terminated acrylonitrile-butadiene rubber, modifying resins such as triglycidyl p-aminophenol and accelerators such as boron trifluoride monoethylamine complexes or imidazole complexes.

Mixtures, such as those described above have application in a broad range of end uses such as in composites, printed circuit boards, castings, molding compounds, adhesives and coatings. In view of the outstanding performance characteristics, the application of greatest interest is in high performance composite applications pertinent, for example, to the aerospace industry. Thus, the modified resins are utilized to pre-impregnate various fibers for eventual use as honeycomb skins or structural parts. Techniques for preparing prepegs are well known to those skilled in the art. In terms of honeycomb skins and structural parts, graphite, glass, Kevlar reinforced skins and parts as well as others, can be readily prepared from the instant systems. Correspondingly, techniques for preparing laminates are well known. Such laminates may be prepared by compression or autoclave molding and may comprise a broad range of thicknesses. A further preferred area of use is adhesion promotion wherein the instant systems effectively improve adhesive performance characteristics.

The following examples illustrate the preferred embodiments of this invention. In these examples, all parts given are by weight unless otherwise noted.

EXAMPLE I

A typical mixture of this invention is prepared by combining 25 grams N,N'-hexamethylene-bis(allyl-bicyclo[2.2.1]hepta-5-ene-2,3-dicarboximide), 40 g triallylisocyanurate, 35 g 2,2'-bis-(4-hydroxy-3-allylphenyl)-propane and 15 g N-allyl-allylbicyclo [2.2.1]hepta-5-ene-2,3-dicarboximide in an aluminum can. The mixture is heated to 95° C. on a hot plate and is blended with an air-driven propeller blade. 100 g of crushed bismaleimides are added into the mixture in small portions. The mixture is maintained at 95° C. for 20 minutes under continuous stirring. The pot temperature is raised to 135° C. at which point 40 g pulverized N,N'-4,4'-diphenylemethane-bis-(allyl-bicyclo[2.2.1]hepta-5-ene-2,3-dicarboximide) is added in small portions. Upon addition, the mixture is blended for 15 minutes at the indicated temperature. The mixture is then cooled to 115° C. and filtered through a 2-ply tricot filter before film coating. The resulting mixture is a homogeneous, high flow liquid at 115° C.

EXAMPLES II-III

The procedure of Example I is repeated utilizing the following components:

|  | Parts | |
|---|---|---|
|  | II | III |
| N,N—hexamethylene-bis-(allylbicyclo[2.2.1]hepta-5-ene-2,3-dicarboximide) | 9.0 | 9.5 |
| triallylisocyanurate | 14.3 | 15.2 |
| 2,2'-bis(4-hydroxy-3-allylphenyl)propane | 12.6 | 13.3 |
| N—allyl-allylbicyclo[2.2.1]hepta-5-ene-2,3-dicarboximide | 10.8 | 5.7 |
| Bismaleimides | 36.0 | 38.0 |
| N,N'—4,4'-diphenylmethane-bis(allylbicyclo[2.2.1]hepta-5-ene-2,3-dicarboximide) | 14.3 | 15.2 |
| 4,4'-diaminodiphenyl methane | 2.9 | 3.0 |

The resulting mixtures are homogeneous, high flow, amber-colored liquids at approximately 115° C.

EXAMPLE IV

Preparation of Laminates

Unidirectional graphite prepreg is prepared from Thornel T-500 graphite fiber (Union Carbide) on the U-D machine under heat and pressure. This gives a prepreg with acceptable drape and tack. The prepreg is cut, layed-up and cured by autoclave curing and post curing in an oven. The autoclave cycle involves full vacuum at room temperature and is followed by application of pressure to 85 psi which is maintained for 15 minutes. Heating is started at 1.7° C./min. until it reaches 80° C. but does not exceed 106° C. The vaccum is vented when the temperature reaches 80° C. The autoclave is held at 80° C. for 2 hours. At the end of the second hour, heating is resumed at 1.7° C./min to 175° C. Temperature is maintained at 175° C. for 4 hours. The autoclave is allowed to cool down in 1½ hours before depressurization and the removal of the laminates from the clave. The laminate is post cured in an oven, free standing for 4 hours at 245° C. with heating rate at about 3° C./min.

Thermomechanical analysis (TMA) to determine the glass transition temperature (Tg) is carried out on the mixture in the penetration mode with a heat-up of 10° C./min and a specimen of 0.034"×0.049". These values are given below.

Fifteen ply, 0° panels are prepared from each of the systems described above. From these laminates, short beam shear, 0° and 90° flexural specimens are obtained. Short beam shear is tested according to ASTM D-2344 at room temperature and 175° C. 0° and 90° flexural properties are tested by ASTM D-790 at room temperature and 175° C. Short beam shear and flexural tensile data appear below.

In addition, fracture toughness test (GlC) and edge delamination tests are conducted. The GlC test is conducted on a series of 3"×1½" specimens with calculated sequential slits. The 0° panel for this test is 12 ply. Edge delamination test is prepared from panels containing the following sequence in the prepreg lay up, [(±25)₂/90]s. These data also appear below.

|  | Ex. I | | Ex. II | | Ex. III | |
|---|---|---|---|---|---|---|
| Tests | — | | — | | 303 | |
| Tg (°C.) | RT | 175° C. | RT | 175° C. | RT | 175° C. |
| 0° flex strength (psi) | 280,130 | 173,512 | 289,887 | 170,718 | 305,633 | 206,304 |
| 90° flex strength (psi) | 13,739 | 6,727 | 17,215 | 5,707 | 16,197 | 7,175 |
| short beam shear (psi) | 16,004 | 8,238 | 16,546 | 7,873 | 16,518 | 9,433 |
| G lC (in-lb./in²) | 1.0 | — | 1.2 | — | 1.2 | — |
| edge delamination (psi) | 36,689 | — | 36,947 | — | 38,874 | — |

These data thus illustrate the progressively improved performance characteristics of the mixtures of this invention.

Summarizing, it is seen that this invention provides improved heat curable mixtures. Variations may be made in procedures, proportions and materials without departing from the scope of the invention as defined by the following claims.

What is claimed is:

1. A heat-curable mixture comprising
(a) at least one compound of formula I

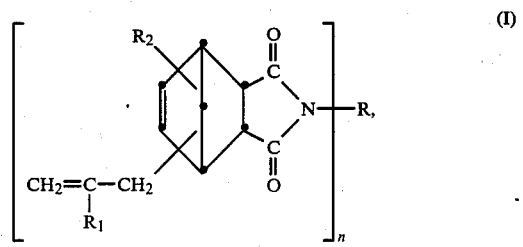

(b) at least one compound of formula II

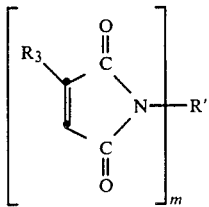

(c) at least one alkenyl phenol or alkenyl phenol ether, and
(d) triallylisocyanurate, in which formulae (I) and (II) above
n is 1 or 2 and m is 2 or 3,
R wherein n is 1, is a hydrogen atom, $C_1-C_{12}$alkyl, $C_3-C_6$alkenyl, $C_5-C_8$cycloalkyl, $C_6-C_{10}$aryl or benzyl, or wherein n is 2, is $-C_pH_{2p}-$, wherein p is 2 to 20, or is $C_6-C_{10}$arylene or a group of the formula III

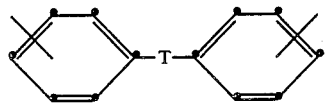

wherein
T is methylene, isopropylidene, $-CO-$, $-O-$, $-S-$ or $-SO_2-$,
R' is an organic radical of valency m which contains 2 to 30 carbon atoms, and
$R_1$, $R_2$ and $R_3$ are each independently a hydrogen atom or a methyl group.

2. The mixture of claim 1, wherein component (a) is present in a concentration of 30 to 45%, component (b) in a concentration of 20 to 40%, component (c) in a concentration of 11 to 22% and component (d) in a concentration of 12 to 16%, all percentages being based on total weight.

3. The mixture of claim 1, wherein each of $R_1$ and $R_2$ is a hydrogen atom.

4. The mixture of claim 1, wherein each of $R_1$ and $R_2$ is a hydrogen atom and R, wherein n is 1, is hydrogen, $C_1-C_8$alkyl, allyl, cyclohexyl, phenyl or benzyl; or, wherein n is 2, R is $-(CH_2)_p-$, in which p is 2 to 12, m- or p-phenylene, or is a group of formula III, wherein T is the methylene group, $-O-$ or $-SO-_2$.

5. The mixture of claim 1, wherein each of $R_1$ and $R_2$ is a hydrogen atom and R, wherein n is 1, is allyl or, wherein n is 2, is $-(CH_2)_6$,

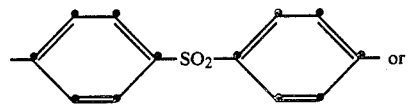

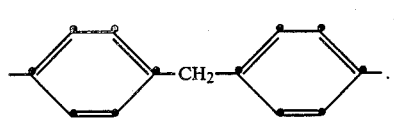

6. A mixture of claim 1, wherein component (a) is N-allyl-allylbicyclo[2.2.1]hept-5-ene-2,3-dicarboximide, bis[4-(allylbicyclo)[2.2.1]hept-5-ene-2,3-dicarboximidophenyl)]-methane or N,N'-hexamethylene-bis(allylbicyclo[2.2.1]hept-5-ene-2,3-dicarboximide), or a mixture thereof.

7. The mixture of claim 1, wherein m is 2, $R_3$ is a hydrogen atom and R' is $-(CH_2)_p-$, in which p is 2 to 12, m- or p-phenylene, or m- or p-xylylene, 1,4-cyclohexylene, 1,4-bis(methylene)cyclohexylene, the radical of 4,4'-bicyclohexylmethane or is a radical of the formula VIIa

wherein $T_1$ is $-O-$, $-CH_2-$ or $-SO_2-$.

8. The mixture of claim 1, wherein component (b) is N,N',4,4'-diphenylmethane-bismaleimide.

9. The mixture of claim 1, wherein component (c) is an alkenyl phenol corresponding to the formulae

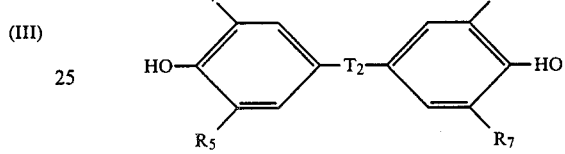

wherein $T_2$ is a direct bond, or $T_2$ represents methylene, isopropylidene, $-O-$, $-S-$, $-SO-$ or $-SO_2-$; and $R_4$, $R_5$, $R_6$ and $R_7$ are independently hydrogen or $C_3-C_4$alkenyl, with the proviso that at least one of $R_4-R_7$ is an alkenyl group;

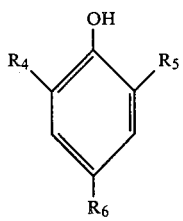

wherein $R_4$, $R_5$ and $R_6$ are independently hydrogen or $C_3-C_4$alkenyl, with the proviso that at least one of $R_4-R_6$ is alkenyl; and

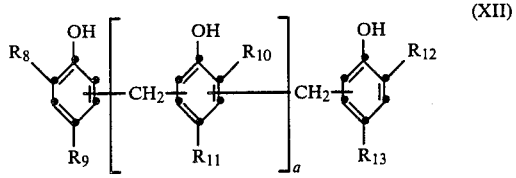

wherein $R_8$, $R_9$, $R_{10}$, $R_{11}$, $R_{12}$ and $R_{13}$ are independently hydrogen, $C_1-C_4$alkyl or $C_3-C_4$alkenyl, with the proviso that at least one of $R_8-R_{13}$ is alkenyl; or the ethers thereof containing at least one $-OR_3$ radical wherein $R_3$ is $C_1-C_{10}$alkyl, aryl or alkenyl.

10. The mixture of claim 9, wherein said alkenyl group is allyl or propenyl.

11. The mixture of claim 10, wherein said alkenyl phenol is 0,0'-diallyl-bisphenol A.

12. The mixture of claim 1 which comprises a mixture of N-allyl-allylbicyclo[2.2.1]hept-5-ene-2,3-dicarboximide, bis[4-(allylbicyclo)[2.2.1]hept-5-ene-2,3-dicarboximidophenyl]-methane, N,N'-hexamethylene-bis(allyl-bicyclo[2.2.1]hept-5-ene-2,3-dicarboximide), N,N',4,4'-diphenylmethane-bismaleimide, 0,0'-diallyl-bisphenol A and triallylisocyanurate.

13. A curable composition comprising the mixture of claim 1 together with a curing catalyst therefor.

14. A curable composition comprising the mixture of claim 12 together with a curing catalyst therefor.

15. The insoluble, infusible, crosslinked product obtained by curing the composition of claim 13.

16. The insoluble, infusible, crosslinked product obtained by curing the composition of claim 14.

17. A laminate structure comprising the cured and pressure molded product of a continuous yarn impregnated with the curable composition of claim 13.

18. A laminate structure comprising the cured and pressure molded product of a continuous yarn impregnated with the curable composition of claim 14.

* * * * *